July 30, 1935.  G. H. FOSTER  2,009,838
PROCESS OF MAKING ACETIC ACID
Filed July 22, 1930
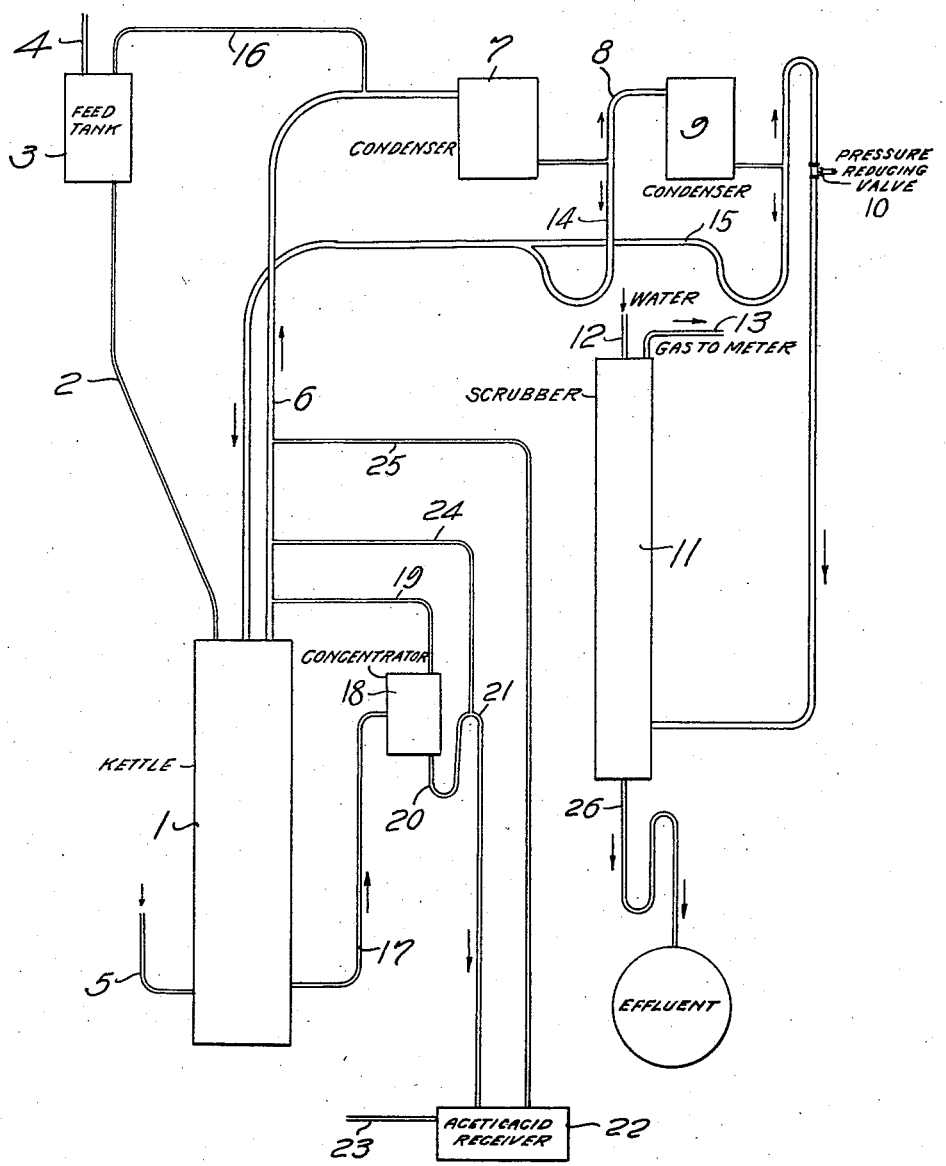
Inventor
GEORGE H. FOSTER,
By S. C. B_____
Attorney Patented July 30, 1935

2,009,838

UNITED STATES PATENT OFFICE 2,009,838

PROCESS OF MAKING ACETIC ACID

George H. Foster, Cranford, N. J., assignor to American Cyanamid Company, New York, N. Y., a corporation of Maine Application July 22, 1930, Serial No. 469,727

11 Claims. (Cl. 260—116)

This invention relates to the continuous manufacture of acetic acid by the oxidation of acetaldehyde.

In processes heretofore described in the literature, it has been proposed to oxidize acetaldehyde by means of a gas containing free oxygen, such as air, the acetaldehyde and air passing through a reacting vessel in a countercurrent manner. Such processes have been difficult to control in that undue temperature variations occurred and particularly over-oxidation of acetaldehyde to formic acid. The latter was probably due to the fact that the oxidizing gas richest in oxygen came first in contact with a reacting mass poorest in acetaldehyde, with the result that considerable quantities of formic acid were produced. In addition, the prior processes were inefficient in that acetic acid was obtained comparatively high in acetaldehyde.

The principal objects of this invention are, therefore, the carrying out of the oxidation of acetaldehyde in a continuous manner, with the production of minimum quantities of formic acid, and to so treat the acetic acid as fast as produced as to free the same from contained acetaldehyde and to return the latter to the reaction vessel. Other important objects are the carrying out of such a process under substantially constant temperature and pressure conditions and to reduce the hazard of fire and explosion to a minimum.

I have discovered that acetic acid may be produced substantially continuously by carrying out the oxidation of acetaldehyde in the liquid phase, either with or without a catalyst, such as manganese acetate or the like, by feeding simultaneously the oxygen-containing gas, acetaldehyde and catalyst, where the latter is used, to a substantially single chamber reaction vessel, while maintaining the charge at a uniform temperature and pressure. By regulating the pressure within the reaction vessel so that the amount of acetaldehyde vaporized will remove the heat of reaction, the temperature of the exothermic reaction may be controlled to a nicety. Means are provided for automatically removing the produced acetic acid from the reaction vessel as fast as formed. It is here proposed to conduct the acetic acid from the reaction vessel to a concentrator fitted with means for maintaining an acetaldehyde vaporizing temperature and to there remove contained acetaldehyde. This vaporized material then passes to condensers, from which the condensed acetaldehyde is returned to the reaction kettle.

There is illustrated in the drawing a diagrammatic view of an apparatus for carrying out the invention.

Referring now with particularity to the diagrammatic drawing, there is shown at 1 a reaction kettle having a single chamber and into which acetaldehyde may be fed through the pipe 2 from the feed tank 3. The feed tank may be continuously or intermittently supplied with additional acetaldehyde by the supply line 4, as desired. Where a catalyst is found necessary or desirable, it may be fed into the reaction kettle 1 through the same supply line for the acetaldehyde or separately therefrom, as desired. The reaction kettle is provided with any desired means for maintaining a constant temperature and pressure therein, such as steam coils, and/or cooling coils, and/or a pump, not shown, as all of these elements are well-known in the art.

An inlet pipe 5 is provided near the bottom of the reaction kettle 1 through which air or other free oxygen-containing gas may be introduced for the oxidation of the acetaldehyde.

A vapor line 6, extending from the top of the reaction kettle, extends to a water-cooled condenser 7 and any uncondensed acetaldehyde passes on through the pipe 8 to the water or brine cooled condenser 9. From the latter condenser the uncondensed gas passes through a pressure regulating valve 10 and into the bottom of a scrubber 11 countercurrent to a flow of water entering at 12, and is vented at 13, preferably through a gas meter or the like. Acetaldehyde condensed in the condensers 7 and 9 is returned by means of pipes 14 and 15, respectively, into the reaction kettle 1 for further oxidation. An equalizing line 16 may be provided between the vapor take-off 6 and top of the acetaldehyde feed tank 3 to communicate the system pressure to the feed tank 3.

An acetic acid take-off pipe is shown at 17 near the bottom of the reaction kettle and passes upwardly therefrom into a concentrator 18 fitted with steam coils, not shown, for the purpose of producing an acetaldehyde vaporizing temperature therein. The acetaldehyde contained in the produced acetic acid, vaporized by the steam coils, passes upwardly through the take-off 19 into the vapor line 6 where it passes to the condensers along with any vaporized acetaldehyde from the reaction kettle. A concentrated acetic acid line is shown at 20, extending from some suitable point in the concentrator 18 upwardly to form a goose-neck 21 and then downwardly into the concentrated acetic acid receiver 22, which is maintained at the system pressure. In most instances it will be found desirable to conduct the acetaldehyde-free acetic acid from the receiver 22 through the line 23 to a continuous rectification apparatus where any desired concentration of acetic acid may be produced, all of which is well-known.

In operating the process according to this invention, a charge of liquid acetaldehyde, or of acetaldehyde and acetic acid, either with or without catalyst, is charged into the reaction kettle 1 to a height determined by the height of the take-off pipe 17. Steam is then let into the coils within the reaction kettle until a desired temperature has been reached and pressure built up to a desired point. Air or other free oxygen-containing gas is introduced through the pipe 1, whereupon the oxidation of acetaldehyde to acetic acid begins. The flow of acetaldehyde through the line 2 into the reaction kettle is continued at substantially the same rate that acetic acid is formed. By regulating the pressure within the reaction vessel, the vaporization of acetaldehyde is controlled, which in turn determines the reaction temperature by removing the heat of reaction to any desired degree. As the acid is formed and as the acetaldehyde is fed into the kettle, the acetic acid overflows automatically through the pipe 17 into the concentrator 18. It can readily be calculated, therefore, that the acid in the kettle will remain at a concentration of approximately 50%. Any free acetaldehyde not oxidized passes upwardly through the vapor line 6 into the condensers 7 and 9, from which it is returned as a condensate to the reaction kettle for further oxidation.

As the acetic acid is produced, the concentrator 18 gradually fills and any contained acetaldehyde therein is boiled off by means of the steam coils therein, the vaporized acetaldehyde being conducted into the vapor line 6 and into the condensers as before. Due to the fact that the outlet 20 for the concentrated acetic acid is provided with the goose-neck 21, the level of liquid within the concentrator is maintained at a constant point and concentrated acetic acid automatically flows from the concentrator to the receiver as fast as formed. In order to prevent a syphoning action through the goose-neck, a vent 24 is provided connecting the upper part of the goose-neck with the vapor line 6. In order to prevent a gas lock in this portion of the apparatus, a vent 25 is likewise provided between the receiver 22 and the vapor line 6.

The uncondensed gases from the condensers 7 and 9 pass through the pressure regulating valve 10 at any desired rate as it will be apparent that this control valve will determine the pressure within the kettle and the rate of take-off of acetaldehyde and other vapors therefrom. These uncondensed gases pass upwardly through the scrubber 11 countercurrent to a flow of water or other scrubbing liquid and are vented at 13, preferably through a gas meter, for control purposes. The effluent from the scrubber may be caught as through the take-off 26 for further disposition as desired.

As a specific example of operating the apparatus shown, a kettle may be charged with a quantity of acetaldehyde and acetic acid in equal weights sufficient to fill the same to the desired level, which will be determined by the location of the upper part of the pipe 17. This likewise initially fills the concentrator to this point. In an apparatus constructed according to this invention, a charge of 1200 lbs. of mixture as above described has been used. Where desired, a catalyst such as manganese acetate may be used in concentrations of less than 1%, the catalyst being added simultaneously with the acetaldehyde addition.

The kettle having been charged as above described, the temperature thereof is then raised to 80° C. while the pressure is raised to 50 lbs. per sq. in. Air may then be admitted through the pipe 5 at a rate of approximately 30 cubic feet per minute of free air, and the pressure regulating valve 10 opened to the point required to allow a corresponding flow. Acetaldehyde is run in through the supply line 2 at a rate sufficient to cause the kettle temperature to remain constant while the pressure is maintained at substantially 50 lbs. per sq. in. As acetic acid is being formed in the reaction kettle, the same will overflow into the concentrator, and a temperature being maintained in that portion of the apparatus sufficient to vaporize the acetaldehyde, to wit, 105° C., the acetic acid is rendered substantially acetaldehyde-free and automatically overflows through the goose-neck 21 from the concentrator to the receiver and this flow is maintained as fast as the concentrated acid is formed.

By maintaining the steam coils in the concentrator at the above temperature, the acetaldehyde content of the acetic acid has been reduced to less than 10% so that the acid overflowing in the receiver is thus obtained at a strength of substantially 90%. The vaporized acetaldehyde from the concentrator is returned to the reacting kettle from the condensers, as above set forth.

From the above, it will be apparent that the invention permits the continuous oxidation of acetaldehyde to acetic acid in such a manner as to produce larger quantities of acetic acid in a given time with a given piece of apparatus, than has heretofore been possible. Moreover, the production of a higher grade of acetic acid, relatively free from acetaldehyde and formic acid, due to over-oxidation, is here set forth. Likewise, inasmuch as it is possible to obtain an apparatus for the continuous distillation and rectification of acetic acid, I am able to conduct the operations of oxidation and rectification expeditiously and without the use of any considerable intermediate storage for the crude acetic acid. Inasmuch as the kettle liquor is of practically constant composition containing a lower concentration of acetaldehyde than has been heretofore required, the danger of explosion and fire is reduced to a minimum.

Analysis of the vented gas passing through the outlet 13 shows that the equipment removes oxygen from the air in practically quantitative amounts. Due to the layout of condensers, any acetaldehyde vaporized in the kettle through the exothermic reaction, is recovered and returned to the kettle without loss.

While the invention has been shown and described with particular reference to the production of acetic acid by the use of certain temperatures, pressures, and other operations, yet obviously I do not wish to be limited thereto, but the invention is to be construed broadly and restricted only by the scope of the claims.

I claim:—

1. A method of producing acetic acid by the oxidation of acetaldehyde, which includes the steps of causing a reaction between an oxidizing gas and liquid acetaldehyde, and vaporizing sufficient quantities of acetaldehyde from the reaction chamber to remove the heat of reaction and maintain the reactants at a constant temperature.

2. A method of producing acetic acid by the oxidation of acetaldehyde, which includes the steps of causing a reaction between liquid acetaldehyde and an oxidizing gas under pressure, and regulating the pressure on the reactant so that sufficient quantities of liquid acetaldehyde are vaporized to remove the heat of reaction.

3. A method of continuously producing acetic acid which comprises continuously flowing acetaldehyde and a gas containing free oxygen to a reaction kettle, maintaining the kettle charge under constant temperature through vaporization of requisite quantities of acetaldehyde, and continuously removing the acetic acid formed.

4. A method of continuously producing acetic acid which comprises continuously flowing acetaldehyde and a gas containing free oxygen to a reaction kettle, maintaining the kettle charge at substantially 80° C. and 50 lbs. per sq. in., and continuously removing the acetic acid formed.

5. A method of continuously producing acetic acid which comprises continuously flowing acetaldehyde and a gas containing free oxygen to a reaction kettle, maintaining the kettle charge under constant temperature by vaporization of requisite quantities of acetaldehyde, continuously removing the acetic acid formed, continuously removing acetaldehyde from the crude acetic acid, condensing both the acetaldehyde removed from the crude acetic acid and that escaping from the kettle due to the heat of reaction, and returning the condensed acetaldehyde to the reaction kettle.

6. A method of continuously producing acetic acid which comprises maintaining a charge of equal parts of acetaldehyde and acetic acid at a temperature of 80° C. and under substantially 50 lbs. pressure, continuously adding acetaldehyde and an oxygen-containing gas to the charge, continuously removing the acetic acid formed to a concentrator, continuously removing contained acetaldehyde from the acetic acid in the concentrator and returning the thus removed acetaldehpde to the reaction kettle.

7. A continuous method of producing acetic acid which comprises continuously flowing acetaldehyde and a gas containing free oxygen counter-current through a reaction kettle, maintaining a heated reaction zone in said kettle in which the acetaldehyde is oxidized to acetic acid, continuously removing acetaldehyde containing acetic acid from said kettle, passing said mixture through a zone outside said kettle, the temperature of which is above the vaporization point of the acetaldehyde in the acetaldehyde-acetic acid mixture, whereby the acetaldehyde is vaporized, condensing the thus separated acetaldehyde and returning the same to the reaction zone, and continuously removing the acetaldehyde free acetic acid.

8. A method of continuously producing acetic acid which comprises passing the charge of equal parts of acetaldehyde and acetic acid through a reaction zone, continuously adding acetaldehyde and oxygen containing gas to said charge, continuously removing the acetic acid formed to a concentrator, continuously removing the contained acetaldehyde from the acetic acid in the concentrator, and returning the thus removed acetaldehyde to the reaction kettle.

9. A continuous method of producing acetic acid which comprises continuously flowing liquid acetaldehyde and a gas containing free oxygen through a reaction kettle, maintaining a heated reaction zone in said kettle in which the acetaldehyde is oxidized to acetic acid, continuously removing acetaldehyde containing acetic acid from said kettle, passing said mixture through a zone outside of said kettle, the temperature of which is above the vaporization point of the acetaldehyde in the acetaldehyde-acetic acid mixture, whereby the acetaldehyde is vaporized, condensing the thus separated acetaldehyde and returning the same to the reaction zone, and continuously removing the acetaldehyde free acetic acid.

10. A process for the continuous production of acetic acid by oxidizing acetaldehyde in a liquid phase and continuously replacing a portion of the reaction liquor by fresh acetaldehyde characterized in that the concentration of acetic acid in the reaction liquor is maintained at approximately 50% and acetic acid is separated from the withdrawn reaction liquor.

11. A method of continuously producing acetic acid which comprises continuously flowing acetaldehyde and a gas containing free oxygen to a reaction zone maintained at a reaction temperature whereby the acetaldehyde is oxidized to acetic acid, maintaining substantially a 50% concentration of acetic acid in the reaction zone and continuously removing the acetic acid from the reaction zone at substantially the rate at which it is formed.

GEORGE H. FOSTER.